United States Patent [19]

Sugita et al.

[11] 4,294,951

[45] Oct. 13, 1981

[54] RAPID CURING POLYURETHANE ELASTOMER PREPARED FROM A DIPHENYLMETHANEDIISOCYANATE BASED LIQUID PREPOLYMER AND A CURING AGENT CONTAINING A POLYTETRAMETHYLENE ETHER GLYCOL, A DIOL AND AN ORGANOMETALLIC CATALYST

[75] Inventors: Toshio Sugita, Yokohama; Hiroaki Sakaguchi, Ashiya; Hisanobu Tsuda, Kamakura; Tsuyoshi Suzuki, Kawasaki, all of Japan

[73] Assignee: Mitsui-Nisso Corporation, Tokyo, Japan

[21] Appl. No.: 168,482

[22] Filed: Jul. 14, 1980

[51] Int. Cl.$^3$ ............................................. C08G 18/72
[52] U.S. Cl. ........................................ 528/55; 528/56; 528/58; 528/66; 528/906
[58] Field of Search ............... 528/55, 56, 58, 66, 528/906; 521/901

[56] References Cited

U.S. PATENT DOCUMENTS

| | | | |
|---|---|---|---|
| 3,056,835 | 10/1962 | Monagle, Jr. et al. | 564/453 AR |
| 3,152,162 | 10/1964 | Fischer et al. | 260/453 AR |
| 3,449,256 | 6/1969 | Farrissey, Jr. et al. | 252/182 |
| 3,635,906 | 1/1972 | Jayawant | 528/66 |
| 3,635,947 | 1/1972 | Kober et al. | 260/238 A |
| 3,641,093 | 2/1972 | Brooks et al. | 260/453 AR |
| 3,644,457 | 2/1972 | König et al. | 260/453 SP |
| 3,681,291 | 7/1972 | Khan | 260/77.5 AQ |
| 3,725,355 | 8/1973 | Parrish et al. | 260/77.5 AP |
| 3,745,134 | 4/1973 | Fensch | 260/2.5 AM |
| 3,761,502 | 9/1973 | Kan et al. | 251/88 |
| 4,120,850 | 10/1978 | Pechhold | 528/66 |
| 4,190,711 | 2/1980 | Zdrahala et al. | 528/66 |
| 4,198,489 | 5/1980 | Schaaf et al. | 521/901 |

FOREIGN PATENT DOCUMENTS

| | | |
|---|---|---|
| 29051 | 7/1959 | Fed. Rep. of Germany . |
| 1092007 | 11/1960 | Fed. Rep. of Germany . |
| 33484 | 2/1967 | Fed. Rep. of Germany . |
| 1769550 | 5/1969 | Fed. Rep. of Germany . |
| 38-4576 | 6/1963 | Japan . |
| 46-38587 | 11/1971 | Japan . |
| 47-1386 | 1/1972 | Japan . |
| 47-22711 | 6/1972 | Japan . |
| 49-118795 | 11/1974 | Japan . |
| 51-125199 | 11/1976 | Japan . |
| 52-2908 | 1/1977 | Japan . |
| 1177097 | 1/1970 | United Kingdom . |
| 1222367 | 2/1971 | United Kingdom . |

*Primary Examiner*—Maurice J. Welsh
*Attorney, Agent, or Firm*—Fisher, Christen & Sabol

[57] ABSTRACT

Rapidly cured polyurethane elastomers are prepared by mixing a diphenylmethanediisocyanate based liquid prepolymer obtained from polytetramethylene ether glycol and an aliphatic diol at specified proportions, and a curing agent essentially containing said polytetramethylene ether glycol, diol and organometallic catalyst.

13 Claims, No Drawings

RAPID CURING POLYURETHANE ELASTOMER PREPARED FROM A DIPHENYLMETHANEDIISOCYANATE BASED LIQUID PREPOLYMER AND A CURING AGENT CONTAINING A POLYTETRAMETHYLENE ETHER GLYCOL, A DIOL AND AN ORGANOMETALLIC CATALYST

BACKGROUND OF THE INVENTION

1. Field Of The Invention

This invention relates to rapid curing polyurethane elastomers. More particularly, this invention provides polyurethane elastomers which are curable and releasable at a relatively low temperature and in a short period of time.

2. Description Of The Prior Art

The so-called casting polyurethane elastomers, which have been widely used in rollers, belts, solid tires, and the like, because of their excellent mechanical characteristics, wear resistance, resistance to oils, and the like, includes two types. One type is the TDI (toluene diisocyanate) prepolymer type which employs MOCA (3,3'-dichloro-4,4'-diaminodiphenylmethane) as a curing agent and employs polytetramethylene ether glycol (hereinafter simply referred to as PTMEG), polyester diol, polyoxypropylene glycol (hereinafter simply referred to as PPG) and the like as the polyol. The other type uses the so-called semi- one shot process in which 1,5-naphthylenediisocyanate or the diphenylmethanediisocyanate/polyester diol system is employed and glycol is employed as the curing agent.

However, the two types mentioned above have drawbacks such as curing thereof takes several hours at about 100° C. and workability is extremely low.

In both types mentioned above, the pot life on mixing the prepolymer with the curing agent can be shortened by use of a catalyst, but it is quite impossible to shorten the curing time to several minutes. Moreover, it is necessary to raise the temperature of the raw materials up to around 100° C. because of the high viscosity of the prepolymer, high melting point of MOCA, and the like. However, no high pressure casting machine, to which the raw material at such a high temperature is applicable, is available at present. Even if such a high pressure casting machine should be available, it is impossible to shorten the curing time to several minutes.

With respect to high density polyurethane foam, which is also called micro-cellular elastomer, and is used as individual automobile parts such as bumpers, and the like, Japanese published examined patent application nos. 22711/1972, 38587/1971 and 1386/1972 each disclose a process in which curing is effected more rapidly at a lower temperature compared with the so-called casting elastomer mentioned above. All the processes disclosed as above follow the so-called one shot process, in which modified diphenylmethanediisocyanate (MDI) is used as the polyisocyanate.

With respect to rapid curing polyurethane elastomers, Japanese Japanese published unexamined patent application nos. 118795/1974 and 125199/1976 disclose the use of a prepolymer as the polyisocyanate. The latter patent application discloses the use of PTMEG in the prepolymer and as a curing agent.

In accordance with the processes disclosed as above, however, it is very difficult to simultaneously satisfy both rapid curability and the physical properties required of the cured product. No elastomer with high physical properties equal to an elastomer obtained from PTMEG/TDI prepolymer represented by Adiprene L-100 (produced by E. I. Du Pont de Nemours & Co.), where MOCA is employed as a curing agent, has been obtained.

The present inventors made an extensive study to obtain an elastomer having rapid curability as well as physical properties equal to those of a casting type elastomer represented by Adiprene L-100 produced by E. I. Du Pont de Nemours & Co. which is cured on heating by use of MOCA. The present inventors discovered that such an elastomer can be obtained by satisfactorily selecting the composition of a prepolymer so that the viscosity thereof may be lowered to such an extent as to be applicable to a casting machine at a temperature of from room temperature to the relatively low temperature of about 60° C.

SUMMARY OF THE INVENTION

The present invention relates to rapid curing polyurethane elastomers which are curable and releasable in a short period of time of from one minute to about twelve minutes at a temperature of from room temperature to a relatively low temperature. The present invention provides a rapid curing polyurethane elastomer, which is prepared by mixing a prepolymer (A), which is liquid at room temperature prepared by reacting 4 to 6 equivalents of a mixture of diphenylmethanediisocyanate and a carbodiimide modified material of said compound, which is liquid at room temperature, with one equivalent of polytetramethylene ether glycol having a mean molecular weight of from 650 to 2000 or a mixture thereof with an aliphatic diol having a molecular weight less than 250, a curing agent (B) essentially consisting of a mixture of one equivalent of said polytetramethylene ether glycol, 1 to 4 equivalents of a diol having a molecular weight less than 250 as chain-elongating agent, and an organometallic catalyst at a NCO/OH equivalent ratio of from 1.00 to 1.10.

DESCRIPTION OF THE PREFERRED EMBODIMENTS

The rapid curing polyurethane elastomers of the present invention are prepared by mixing a prepolymer (A), which is liquid at room temperature and which is prepared by reacting 4 to 6 equivalents of a mixture of pure diphenylmethanediisocyanate (hereinafter simply referred to as MDI) and a carbodiimide modified material of said compound (MDI) which is liquid at room temperature, with one equivalent of polytetramethylene ether glycol having a mean molecular weight of from 650 to 2000 or a mixture of said glycol with an aliphatic diol having a molecular weight less than 250, and a curing agent (B) essentially consisting of a mixture of one equivalent of said polytetramethylene ether glycol, 1 to 4 equivalents of a diol having a molecular weight less than 250 as a chain-elongating agent, and an organometallic catalyst at a NCO/OH equivalent ratio of from 1.00 to 1.10, preferably 1.03 to 1.07. The elastomer is curable and releasable in a short period of time of from one minute to about 12 minutes at a relatively low temperature of from room temperature to 60° C. by controlling the amount of the catalyst so that the pot life on mixing (A) and (B) may be in the range of from about 12 seconds to several minutes.

In the preparation of the polyurethane elastomers of the present invention, the mixing can be by use of a high pressure casting machine, a low pressure casting machine, a batch type agitator, or the like, depending on the pot life on mixing of the prepolymer and the curing agent. The pot life is controlled in the range of from about 12 seconds to several minutes by selecting a prepolymer of a suitable composition, and a curing agent; particularly, the amount of catalyst used for urethane formation.

As used herein, carbodiimide modified material of MDI, which is liquid at room temperature, means one prepared according to the processes disclosed in Japanese published examined patent application nos. 4576/1963, and 2908/1977, herein incorporated by reference.

Examples of aliphatic diols having a molecular weight less than 250 include ethylene glycol (hereinafter simply referred to as EG), propylene glycol (hereinafter simply referred to as PG), dipropylene glycol (hereinafter simply referred to as DPG), diethylene glycol (hereinafter simply referred to as DEG), 1,4-butane-diol, cyclohexane dimethanol and the like. Aromatic diols such as bishydroxyethyoxybenzene, p-xylylene-diol and the like can also be used in preparing the curing agent.

Examples of the organometallic catalyst used include known catalysts for urethane formation such as dibutyl-tin dilaurate (hereinafter simply referred to as DBTDL), lead octylate, cobalt naphthenate, and the like. As discussed above, the pot life upon mixing the prepolymer and the curing agent can be controlled by the amount of the catalyst used for urethane formation. The pot life is readily controlled simply by increasing or decreasing the amount of the catalyst. For example, 0.05 parts (hereinafter part represents part by weight), 0.2 parts, and 0.6 parts respectively of DBTDL based on 100 parts of a curing agent result in pot lives of 5 minutes, one minute, and about 20 seconds, respectively.

The term "pot life" as used herein means a period of time required from the time at which two solutions are mixed to the time at which the fluidity thereof is almost lost with the viscosity thereof increasing to 1000 ps.

The high pressure casting machine means, for example, a casting machine such that two stock solutions are circulated under a circulating pressure of from 150 to 200 kg/cm$^2$ by high pressure pumps, such as an axial piston pump and a Bosch pump, respectively, and these high pressure streams impinge directly onto each other in a small mixing cavity to cause an intimate mixing of liquids. The mixture is then subjected to casting, and the like. The low pressure casting machine is a casting machine wherein two stock solutions are sent to a mixing part by low pressure pumps such as a gear pump. These solutions are mixed with agitation by a rotor mixer, a static mixer, or the like and then subjected to casting and the like. The batch type agitator used is most preferably of such a type that air bubbles are not entrained therein on agitation. For example, a suitable agitator is AJITER (trade name of Shimazaki Equipment Co., Ltd.).

In the practice of the present invention, the prepolymer (A) and the curing agent (B) are used at room temperature as they are, or at a state where they are warmed up to about 60° C. in order that the viscosity thereof may be lowered depending on the case required. Examples of the casting process applicable include various casting processes which are applicable to so-called casting elastomers, the Reaction Injection Molding Process (simply referred to as RIM process), in which a high pressure casting machine is used, and a process in which a thick coating is effected by use of an airless spray machine, and the like.

The present invention will be further illustrated by way of the following Examples and Comparative Examples. Hereinafter, % and part represent % by weight and part by weight, respectively, and temperatures are in °C. unless indicated otherwise.

EXAMPLE 1

One equivalent of PTMEG having an average molecular weight of 1000 and 5.4 equivalents of a polyisocyanate mixture prepared by mixing MDI and carbodiimide-modified MDI (liquid at room temperature and hereinafter simply referred to as liquid MDI) at the ratio by weight of 7 to 3 are reacted by 80° C. for 3 hours to obtain prepolymer (C) having a free isocyanate radical content of 14.8% and a viscosity of 2000 cps at 25° C.

One equivalent of PTMEG having an average molecular weight of 1000, 2 equivalents of 1,4-butane-diol, and 0.05 g of DBTDL are mixed to obtain a curing agent (D).

The prepolymer (C) and the curing agent (D) are subjected to vacuum degassing, both solutions are then mixed thoroughly for one and one-half minutes in such a manner that bubbles are not entrained therein by use of an agitator at such a blend ratio that the NCO/OH equivalent ratio is 1.05. The mixture is casted into a mold for a sheet of 2 mm in thickness in an oven maintained at 60° C. The period of time from the time at which the mixing of the two solutions is started to the time at which the viscosity of the mixture reaches 1000 ps is five minutes, and the cured material has neither bubbles involved therein nor cracks and is releasable in 10 minutes after starting the mixing of the two solutions.

The physical properties of the product are equal to those of an elastomer prepared by curing Adiprene L-100 of E. I. Du Pont de Nemours & Co. with MOCA as shown in Table 1.

EXAMPLE 2

A curing agent is prepared by mixing one equivalent of PTMEG having an average molecular weight of 1000, 2 equivalents of 1,4-butane-diol, and 0.2 g of DBTDL. The curing agent and the prepolymer (C) obtained in Example 1 are mixed by a low pressure casting machine (AF-206 Type urethane foam foaming machine of Toho Machinery Co., Ltd.; in which a gear pump of a maximum discharge amount of 3 l/min is used for both solutions and the solutions are mixed by a mixing rotor). They are mixed with agitation at a blend ratio such that the NCO/OH equivalent ratio is 1.05. The mixture is cast into a mold for a sheet of 2 mm in thickness maintained at 50° C. at a discharge of 2 kg/min. The period of time from starting the discharge from the mixing head to the time when the viscosity thereof reaches 1000 ps at 25° C. is one minute. The cured product is releasable in 5 minutes and has neither bubbles involved therein nor cracks. The product shows the same values for physical properties as in the case of the batch type agitation in Example 1 as shown in Table 1.

EXAMPLE 3

A curing agent prepared by mixing one equivalent of PTMEG having an average molecular weight of 1000, 2 equivalents of 1,4-butanediol, and 0.6 g of DBTDL and the prepolymer (C) obtained in Example 1 are subjected to casting under the conditions of an NCO/OH equivalent ratio of 1.05 and a discharge amount of 7.5 kg/min (125 g/sec) by use of a high pressure casting machine (NR-215 Type of Toho Machinery Co., Ltd.; where an axial piston pump having a maximum discharge amount of 7.5 l/min is used for both solutions). The period of time from starting the discharge from the mixing head to the time when the viscosity thereof reaches 1000 ps is approximately 20 seconds, and the cured product is releasable in one and one-half minutes.

The cured product thus obtained is free of bubbles, voids, cracks, and the like. The physical properties of the cured product are found to be comparable to those in Examples 1 and 2 as shown in Table 1.

COMPARATIVE EXAMPLE 1

One equivalent of PTMEG having an average molecular weight of 1500 and 7.1 equivalents of a polyisocyanate mixture prepared by blending MDI and the liquid MDI at a ratio by weight of 7 to 3 are reacted at 80° C. for 3 hours to obtain a prepolymer (E) having a free NCO content of 14.8% and a viscosity of 2800 cps at 25° C.

The prepolymer (E) thus obtained and the curing agent (D) obtained in Example 1 are subjected to a casting test at an NCO/OH equivalent ratio of 1.05 in the same manner as in Example 1.

The period of time from starting the mixing of the two solutions (E) and (D) to the time when the viscosity of the mixture reaches 1000 ps is three and one-half minutes, and it takes 20 minutes for release.

Fine cracks were found in a part of the cured product. The physical properties of the portion free of cracks are good as shown in Table 1, but the cured product shows poor moldability such as a prolonged time for release, development of cracks, and the like as described above.

COMPARATIVE EXAMPLE 2

One equivalent of a glycol mixture prepared by blending PTMEG having an average molecular weight of 1000 and DPG to make the average molecular weight of the mixture 500 and 3.6 equivalents of a polyisocyanate mixture prepared by blending MDI and liquid MDI at a ratio by weight of 7 to 3 are reacted at 80° C. for 3 hours to obtain a prepolymer (F) having a free NCO content of 14.8% and a viscosity of 7500 cps at 25° C.

The prepolymer (F) and the curing agent (D) obtained in Example 1 are subjected to a casting test at an NCO/OH equivalent ratio of 1.05 in the same manner as in Example 1.

The period of time from the moment at which mixing of the two solutions is started to the time when the viscosity of the mixture reaches 1000 ps is five and one-half minutes, and it takes 10 minutes for release.

Neither bubbles involved therein nor cracks were found in the cured product. However, the high viscosity of the prepolymer required a prolonged mixing time. Resilience, which is very important as a physical property of an elastomer, was greatly lowered.

Thus, according to Comparative Example 2, no lowering in moldability such as development of cracks, and the like, took place. However, difficulties in handling due to an increase in viscosity of the prepolymer, lowering of the physical properties of the elastomer, and the like were experienced.

COMPARATIVE EXAMPLE 3

Hiprene L-100 (trade name of Mitsui-Nisso Corporation for prepolymer from PTMEG/TDI having an NCO content of 4.2% and a viscosity of 18,000 cps at 25° C., and comparable to Adiprene L-100) is subjected to thorough degassing at 80° C. It is then thoroughly mixed with fused MOCA at 120° C. in such a manner that bubbles are not entrained therein for one minute at a blend ratio of 100 to 12.5, that is, at a NCO/OH equivalent ratio of 1.07. The mixture is cast into a mold in an oven maintained at 100° C. One hour after casting, a cured elastomer is released from the mold, and is subjected to post curing for about 20 hours in an oven at 100° C. The physical properties of the elastomer after post curing are shown in Table 1.

| Physical Properties | Example | | | Comparative Examples | | |
|---|---|---|---|---|---|---|
| | 1 | 2 | 3 | 1 | 2 | 3 |
| Hardness (JIS-A type durometer) | 88 | 88 | 87 | 88 | 89 | 90 |
| Modulus 100% (kg/cm$^2$) | 75 | 78 | 74 | 73 | 83 | 77 |
| 300% | 136 | 144 | 133 | 134 | 200 | 148 |
| Tensile strength (kg/cm$^2$) | 350 | 370 | 400 | 380 | 410 | 350 |
| Elongation at breakage (%) | 520 | 500 | 490 | 540 | 410 | 450 |
| Tear strength (kg/cm) | 89 | 90 | 90 | 92 | 81 | 89 |
| Resilience (%) | 58 | 56 | 55 | 59 | 36 | 55 |
| Compression set (%) (70° C., 22 hours) | 32 | 35 | 33 | 31 | 37 | 27 |

What is claimed is:

1. A rapid curing polyurethane elastomer, said elastomer being prepared by a process comprising mixing:
A. a prepolymer which is liquid at room temperature and which is prepared by reacting:
   1. about 4 to about 6 equivalents of a mixture of diphenylmethanediisocyanate and a carbodiimide modified material of said diisocyanate, said modified material being liquid at room temperature, with
   2. about one equivalent of polytetramethylene ether glycol having a mean molecular weight of from about 650 to about 2000, or with about one equivalent of a mixture of said polytetramethylene ether glycol and an aliphatic diol having a molecular weight less than about 250, and
B. a curing agent consisting essentially of a mixture of about one equivalent of said polytetramethylene ether glycol, about one to about four equivalents of a diol having a molecular weight less than about 250 as a chain-elongating agent, and an organometallic catalyst, the weight ratio of the prepolymer to the curing agent being such that the NCO/OH equivalent ratio is about 1.00 to about 1.10.

2. A rapid curing polyurethane elastomer as claimed in claim 1 wherein said prepolymer is prepared by reacting said mixture of diisocyanate and modified diisocyanate with about one equivalent of said polytetramethylene ether glycol.

3. A rapid curing polyurethane elastomer as claimed in claim 1 wherein said prepolymer is prepared by reacting said mixture of diisocyanate and modified diisocyanate with about one equivalent of a mixture of said polytetramethylene ether glycol and said aliphatic diol.

4. A rapid curing polyurethane elastomer as claimed in claim 1 or 3 wherein said aliphatic diol is selected from the group consisting of ethylene glycol, propylene glycol, dipropylene glycol, diethylene glycol, 1,4-butane-diol, and cyclohexane dimethanol.

5. A rapid curing polyurethane elastomer as claimed in claim 1 or 2 wherein said diol chain-elongating agent is selected from the group consisting of ethylene glycol, propylene glycol, dipropylene glycol, diethylene glycol, 1,4-butane-diol, cyclohexane dimethanol, bishydroxyethoxybenzene, and p-xylylene-diol.

6. A rapid curing polyurethane elastomer as claimed in claim 1 wherein said organometallic catalyst is selected from the group consisting of dibutyltin dilaurate, lead octylate, and cobalt naphthenate.

7. A rapid curing polyurethane elastomer as claimed in claim 1 or 6 wherein the amount of said organometallic catalyst is between about 0.05 and 0.6 parts by weight of organometallic catalyst per 100 parts by weight of said curing agent.

8. A rapid curing polyurethane elastomer as claimed in claim 1 wherein said NCO/OH equivalent ratio is 1.03 to 1.07.

9. A rapid curing polyurethane elastomer as claimed in claim 1 wherein said elastomer is curable and mold-releasable in a period of time of from about one minute to about 12 minutes at a temperature of from about room temperature to about 60° C.

10. A rapid curing polyurethane elastomer as claimed in claim 1 wherein the pot life on mixing said prepolymer and said curing agent is in the range of from about 12 seconds to about 5 minutes, said pot life being the period of time from mixing the prepolymer with the curing agent to the time of viscosity of the mixture reaches 1000 ps.

11. A rapid curing polyurethane elastomer as claimed in claim 1, 2, 3, or 9 wherein said prepolymer and said curing agent are mixed and cured by means of a high pressure casting machine.

12. A rapid curing polyurethane elastomer as claimed in claim 1, 2, 3, or 9 wherein said prepolymer and said curing agent are mixed and cured by means of a low pressure casting machine.

13. A rapid curing polyurethane elastomer as claimed in claim 1 wherein the weight ratio of said diphenylmethanediisocyanate to said carbodiimide modified material of said diisocyanate is about 7 to 3.

* * * * *